(12) United States Patent
Hayashi

(10) Patent No.: US 11,761,458 B2
(45) Date of Patent: Sep. 19, 2023

(54) COMPRESSOR AND TURBOCHARGER INCLUDING COMPRESSOR

(71) Applicant: MITSUBISHI HEAVY INDUSTRIES ENGINE & TURBOCHARGER, LTD., Sagamihara (JP)

(72) Inventor: Yoshihiro Hayashi, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/782,836

(22) PCT Filed: Dec. 17, 2019

(86) PCT No.: PCT/JP2019/049497
§ 371 (c)(1),
(2) Date: Jun. 6, 2022

(87) PCT Pub. No.: WO2021/124466
PCT Pub. Date: Jun. 24, 2021

(65) Prior Publication Data
US 2023/0003231 A1      Jan. 5, 2023

(51) Int. Cl.
*F04D 29/44* (2006.01)
*F04D 17/10* (2006.01)
(Continued)

(52) U.S. Cl.
CPC ........... *F04D 29/441* (2013.01); *F04D 17/10* (2013.01); *F04D 27/0215* (2013.01); *F04D 29/4213* (2013.01); *F05D 2220/40* (2013.01)

(58) Field of Classification Search
CPC .... F04D 29/441; F04D 17/10; F04D 27/0215; F04D 29/4213; F05D 2220/40; Y02T 10/12; F02B 37/162
See application file for complete search history.

(56) References Cited

U.S. PATENT DOCUMENTS

2014/0069096 A1   3/2014 Murayama
2016/0131148 A1 * 5/2016 Murayama ............ F04D 29/681
                                                              415/58.4

FOREIGN PATENT DOCUMENTS

DE    10 2008 014 681 A1    10/2009
DE    10 2012 015 325 A1     2/2014
(Continued)

OTHER PUBLICATIONS

Machine Translation of DE-102012015325-A1 (Year: 2014).*
(Continued)

*Primary Examiner* — Brandon D Lee
(74) *Attorney, Agent, or Firm* — Birch, Stewart, Kolasch & Birch, LLP

(57) ABSTRACT

A compressor is provided with: an impeller a housing configured to rotatably house the impeller and having an intake passage for introducing a gas to the impeller from outside the housing, a scroll passage for guiding the gas having passed through the impeller to the outside, and a bypass passage connecting the intake passage and the scroll passage so as to bypass the impeller; and a bypass valve having a valve body disposed in the bypass passage and capable of opening and closing the bypass passage. The valve body is configured to, in a fully closed state, separate the bypass passage into an inlet-side passage having a communication port communicating with the scroll passage and an outlet-side passage communicating with the intake passage. An inlet-side passage wall surface which defines the inlet-side passage includes at least an upstream passage wall surface portion connected to an upstream end of the communication port in a cross-sectional view of the housing taken along an axis of the impeller. The upstream passage wall surface portion is configured such that an angle between the upstream passage wall surface portion and an
(Continued)

upstream scroll wall surface of a scroll passage wall surface which defines the scroll passage connected to the upstream end is less than 90 degrees.

7 Claims, 7 Drawing Sheets

(51) Int. Cl.
*F04D 27/02* (2006.01)
*F04D 29/42* (2006.01)

(56) References Cited

FOREIGN PATENT DOCUMENTS

| DE | 102012015325 A1 | * | 2/2014 | ............. B60T 13/52 |
|---|---|---|---|---|
| JP | 55-142994 A | | 11/1980 | |
| JP | 58-68000 U | | 5/1983 | |
| JP | 61-57137 U | | 4/1986 | |
| JP | 2012-241558 A | | 12/2012 | |

OTHER PUBLICATIONS

International Preliminary Report on Patentability and Written Opinion of the International Searching Authority for International Application No. PCT/JP2019/049497, dated Jun. 30, 2022, with English translation.
International Search Report for International Application No. PCT/JP2019/049497, dated Mar. 3, 2020.

* cited by examiner

COMPRESSOR AND TURBOCHARGER INCLUDING COMPRESSOR

TECHNICAL FIELD

The present disclosure relates to a compressor, and a turbocharger including the compressor.

BACKGROUND

For example, a centrifugal compressor of a turbocharger for a passenger vehicle is operated near a surging line, which is an operating limit on the small flow rate side, when a low-speed engine is suddenly accelerated. Generally, the centrifugal compressor is operated with a predetermined margin from the surging line, and a bypass valve is often used as a fail-safe device to dynamically avoid surging.

The bypass valve has a function of opening and closing a bypass passage connecting the outlet side (scroll passage downstream of the impeller) and the inlet side (supply passage upstream of the impeller) of the compressor. During normal operation of the engine, the bypass valve closes the bypass passage. When a disturbance accompanied by a sudden decrease in surge margin occurs, such as a sudden increase in boost pressure due to over-rotation of the turbine, the bypass valve opens the bypass passage to allow the compressed fluid flowing on the outlet side of the compressor to return to the inlet side of the compressor through the bypass passage. This reduces the boost pressure of the compressor and ensures a surge margin.

On the other hand, the provision of the bypass passage leads to an increase in pressure loss. Specifically, when the bypass passage is closed by the bypass valve, a cavity portion communicating with the scroll passage is formed in the bypass passage. If a large amount of fluid flowing through the scroll passage enters the cavity portion, the fluid entering the cavity portions forms a swirl and is then returned to the scroll passage. The returned fluid may interfere with the fluid flowing through the scroll passage and cause a large pressure loss, which may reduce the efficiency of the compressor. For example, the compressor provided with the bypass passage and the bypass valve may have a decrease in efficiency of about 2 to 3% at the maximum output point of the engine as compared with a configuration not provided with the bypass passage and the bypass valve. This decrease in efficiency corresponds to approximately 10% of the loss in the entire compressor.

CITATION LIST

Patent Literature

Patent Document 1: JP2012-241558A

SUMMARY

Problems to be Solved

To solve such a problem of increase in pressure loss, Patent Document 1 proposes to form the surface of the valve body of the bypass valve in accordance with the inner wall of the scroll passage of the compressor. With this structure, it is possible to suppress the increase in pressure loss due to the flow into the bypass passage.

However, bypass valves are often made of general-purpose products, and it is necessary to use custom-made products in order to form the surface of the valve body into a specific shape in accordance with the inner wall of the pipe, which leads to an increase in cost.

In view of the above, an object of at least one embodiment of the present disclosure is to provide a compressor that can suppress the increase in pressure loss of the compressor while suppressing the complexity of the valve body shape of the bypass valve, and a turbocharger including the turbocharger.

Solution to the Problems

A compressor according to the present disclosure comprises: an impeller; a housing configured to rotatably house the impeller and having an intake passage for introducing a gas to the impeller from outside the housing, a scroll passage for guiding the gas having passed through the impeller to the outside, and a bypass passage connecting the intake passage and the scroll passage so as to bypass the impeller; and a bypass valve having a valve body disposed in the bypass passage and capable of opening and closing the bypass passage. The valve body is configured to, in a fully closed state, separate the bypass passage into an inlet-side passage having a communication port communicating with the scroll passage and an outlet-side passage communicating with the intake passage. An inlet-side passage wall surface which defines the inlet-side passage includes at least an upstream passage wall surface portion connected to an upstream end of the communication port in a cross-sectional view of the housing taken along an axis of the impeller. The upstream passage wall surface portion is configured such that an angle between the upstream passage wall surface portion and an upstream scroll wall surface of a scroll passage wall surface which defines the scroll passage connected to the upstream end is less than 90 degrees.

A turbocharger according to the present disclosure comprises: the compressor; and a turbine having a turbine rotor connected to the impeller of the compressor via a rotational shaft.

Advantageous Effects

At least one embodiment of the present disclosure provides a compressor that can suppress the increase in pressure loss of the compressor while suppressing the complexity of the valve body shape of the bypass valve, and a turbocharger including the turbocharger.

DETAILED DESCRIPTION

Figure 1:
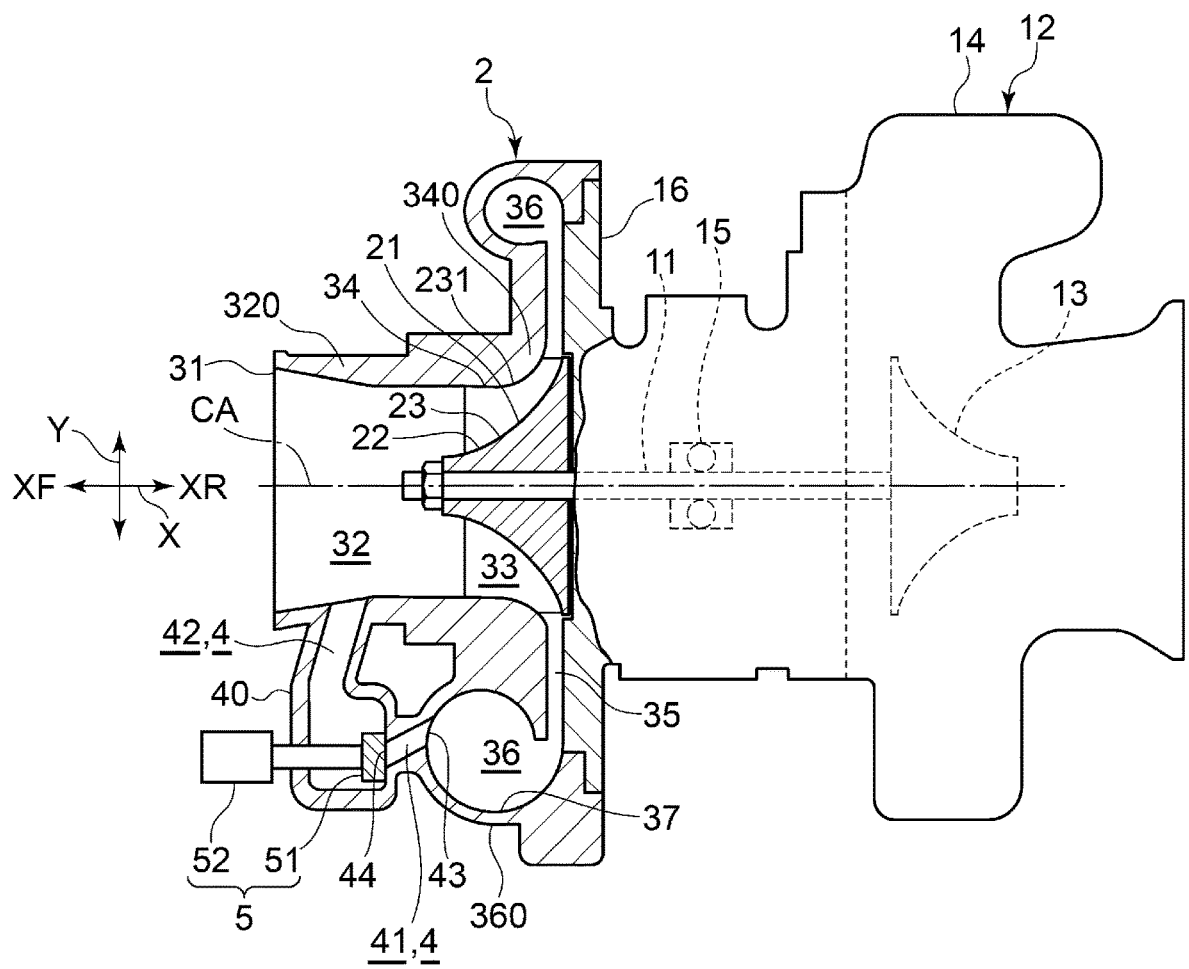
FIG. 1 is a schematic diagram schematically showing a configuration of a turbocharger according to an embodiment of the present disclosure and is a cross-sectional view of a compressor side of the turbocharger.

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The same features can be indicated by the same reference numerals and not described in detail.

(Turbocharger)

Figure 2:
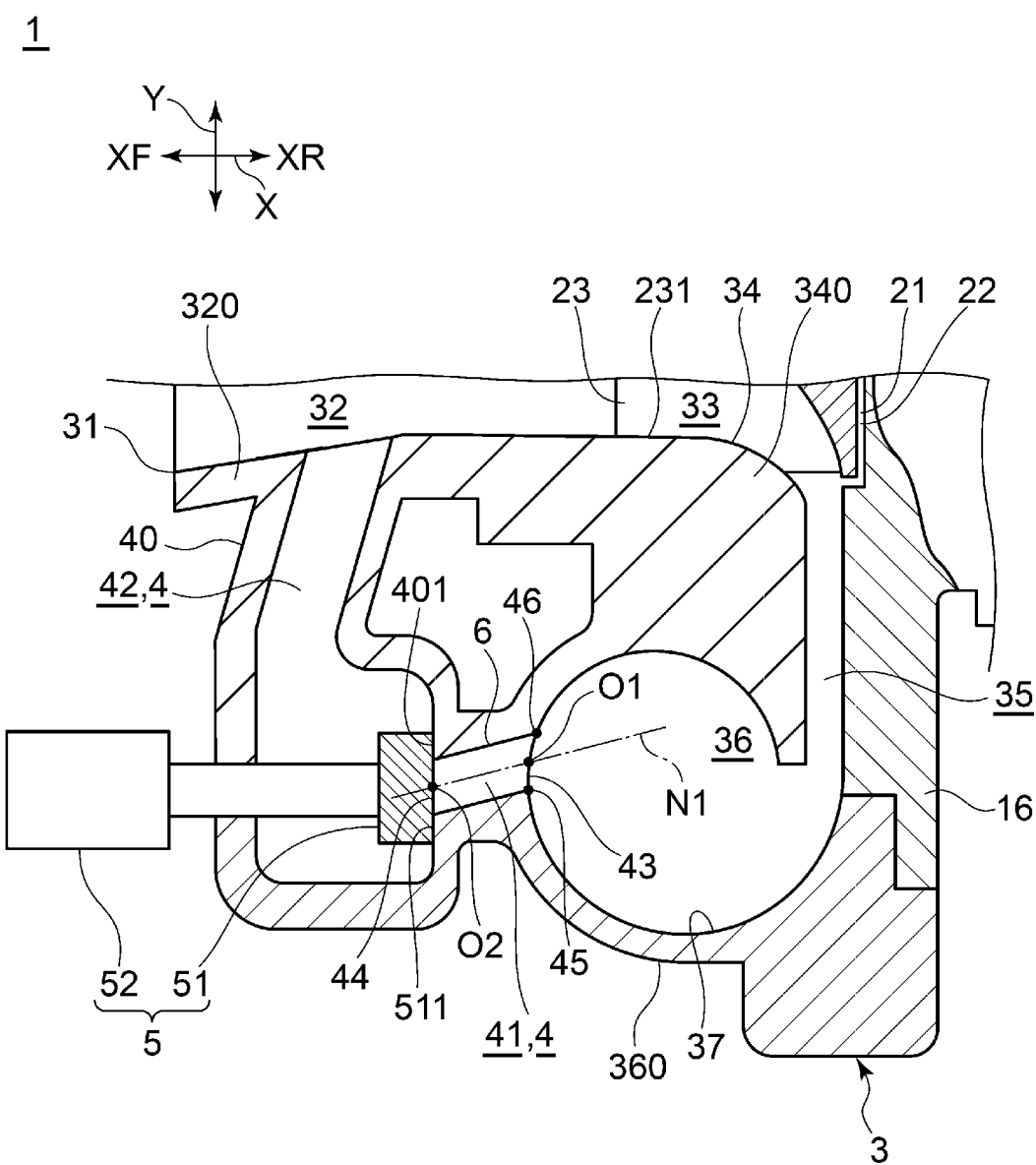
FIG. 2 is a schematic cross-sectional view of the vicinity of a bypass passage of the turbocharger shown in FIG. 1.

FIG. 1 is a schematic diagram schematically showing a configuration of a turbocharger according to an embodiment of the present disclosure and is a cross-sectional view of a compressor side of the turbocharger. FIG. 2 is a schematic cross-sectional view of the vicinity of a bypass passage of the turbocharger shown in FIG. 1.

As shown in FIG. 1, a compressor 2 according to some embodiments is mounted on a turbocharger 1. The turbocharger 1 comprises a turbocharger for automobiles including a compressor 2 and a turbine 12. The compressor 2 includes an impeller 21, a housing (compressor housing) 3 configured to rotatably house the impeller 21, and a bypass valve 5. The turbine 12 includes a turbine rotor 13 mechanically connected to the impeller 21 via a rotational shaft 11, and a turbine housing 14 configured to rotatably house the turbine rotor 13. As an example of the turbocharger, the turbocharger 1 for automobiles will be described, but the present disclosure can also be applied to turbochargers used for applications other than automobiles (for example, ships and onshore power generation).

In the illustrated embodiment, as shown in FIG. 1, the turbocharger 1 further includes a rotational shaft 11, a bearing 15 rotatably supporting the rotational shaft 11, and a bearing housing 16 configured to house the bearing 15. The bearing housing 16 is arranged between the housing 3 and the turbine housing 14, and is mechanically connected to the housing 3 and the turbine housing 14 by fastening members (e.g., fastening bolts or V clamps).

Hereinafter, for example as shown in FIG. 1, the direction in which the axis CA of the impeller 21 (compressor 2) extends is defined as the axial direction X, and the direction perpendicular to the axis CA is defined as the radial direction Y. In the axial direction X, the intake port side (left side in the figure) where an intake port 31 is positioned with respect to the impeller 21 is defined as the front side XF, and the side opposite to the intake port 31 side (right side in the figure) is defined as the rear side XR.

The rotational shaft 11 has a longitudinal direction along the axial direction X. The impeller 21 is mechanically connected to one end portion (the end portion on the front side XF) of the rotational shaft 11, and the turbine rotor 13 is mechanically connected to the other end portion (the end portion on the rear side XR). In the illustrated embodiment, the impeller 21 is disposed coaxially with the turbine rotor 13. The expression "along a certain direction" includes not only the certain direction but also a direction inclined with respect to the certain direction (for example, within ±45° from the certain direction).

As shown in FIG. 1, the housing 3 has an intake port 31 for introducing a gas (e.g., combustion gas such as air) from outside the housing 3. Further, the housing 3 has a discharge port (not shown) for discharging the gas having passed through the impeller 21 to the outside of the housing 3 to send the gas to an internal combustion engine (not shown) (e.g., engine).

The turbocharger 1 rotates the turbine rotor 13 by exhaust gas supplied from the internal combustion engine (not shown). Since the impeller 21 is mechanically connected to the turbine rotor 13 via the rotational shaft 11, the impeller 21 rotates in conjunction with the rotation of the turbine rotor 13. By rotating the impeller 21, the turbocharger 1 compresses the gas introduced into the housing 3 and sends the gas to the internal combustion engine.

(Impeller)

As shown in FIG. 1, the impeller 21 includes a hub 22 and a plurality of impeller blades 23 disposed on the outer peripheral surface of the hub 22. The hub 22 is mechanically fixed to one end portion of the rotational shaft 11. Thus, the hub 22 and the plurality of impeller blades 23 can rotate in conjunction with the rotational shaft 11 about the axis CA of the impeller 21. The impeller 21 is configured to guide the gas sent from the front side XF in the axial direction X to the outer side in the radial direction Y. A gap (clearance) is formed between a tip 231 (tip-side edge) of the impeller blade 23 and a shroud surface 34 of the housing 3.

(Basic Configuration of Housing)

As shown in FIGS. 1 and 2, the housing 3 has an intake passage 32 for introducing the gas to the impeller 21 from outside the housing 3, a scroll passage 36 for guiding the gas having passed through the impeller 21 to the outside, and a bypass passage 4 connecting the intake passage 32 and the scroll passage 36 so as to bypass the impeller 21. The intake passage 32, the scroll passage 36, and the bypass passage 4 are formed within the housing 3.

In the illustrate embodiment, as shown in FIGS. 1 and 2, the housing 3 is combined with another member (e.g., bearing housing 16) to form an impeller chamber 33 for rotatably accommodating the impeller 21, and a diffuser passage 35 for guiding the gas from the impeller 21 to the scroll passage 36. Hereinafter, upstream in the flow direction of the gas flowing in the housing 3 may simply be referred to as "upstream", and downstream in the gas flow direction may simply be referred to as "downstream".

The intake passage 32 extends along the axial direction X and communicates with the intake port 31 disposed on the front side XF (upstream side) and the inlet of the impeller chamber 33 disposed on the rear side XR (downstream side). The scroll passage 36 has a scroll shape surrounding the periphery (the outer side in the radial direction Y) of the impeller 21. The diffuser passage 35 extends along a direction intersecting (e.g., perpendicular to) the axis CA of the impeller 21 (compressor 2). The scroll passage 36 communicates with the diffuser passage 35 disposed on the upstream side and the discharge port (not shown) disposed on the downstream side. The diffuser passage 35 communicates with the outlet of the impeller chamber 33 disposed on the upstream side and the scroll passage 36.

The gas is introduced into the housing 3 through the intake port 31 of the housing 3, flows through the intake passage 32 to the rear side XR along the axial direction X, and then is sent to the impeller 21. The gas sent to the impeller 21 flows outward in the radial direction through the diffuser passage 35 and the scroll passage 36 in this order, and then is discharged to the outside of the housing 3 through the discharge port (not shown).

In the illustrated embodiment, as shown in FIGS. 1 and 2, the housing 3 includes an intake introducing portion 320 which forms the intake passage 32, a shroud portion 340 having a shroud surface 34 which is curved convexly so as to face the tips 231 of the impeller blades 23, a scroll passage forming portion 360 which forms the scroll passage 36, and a bypass passage forming portion 40 which forms the bypass passage 4. The bypass passage forming portion 40 is connected at one end to the intake introducing portion 320 and at the other end to the scroll passage forming portion 360.

The intake introducing portion 320 is formed in a cylindrical shape that internally defines the intake passage 32. The intake port 31 is formed at the end portion of the intake introducing portion 320 on the front side XF.

The shroud portion 340 is disposed between the intake introducing portion 320 and the scroll passage forming portion 360. The shroud surface 34 of the shroud portion 340 defines a portion of the impeller chamber 33 on the front side XF, and faces each of the tips 231 of the impeller blades 23.

The scroll passage forming portion 360 has a scroll passage wall surface 37 which defines the scroll passage 36.

(Bypass Valve)

As shown in FIGS. 1 and 2, the bypass valve 5 has a valve body 51 disposed in the bypass passage 4 and capable of opening and closing the bypass passage 4. In the illustrated embodiment, the bypass valve 5 further has an actuator 52 configured to drive the valve body 51 to control the opening and closing operation of the valve body 51. When the discharge pressure of the compressor 2 rises excessively, the valve is switched to the open state to open the bypass passage 4, and the gas flowing through the scroll passage 36 (gas compressed by the impeller 21) is returned to the intake passage 32 through the bypass passage 4. When the discharge pressure of the compressor 2 is low, the valve is switched to the closed state to close the bypass passage 4 by the valve body 51.

As shown in FIGS. 1 and 2, the valve body 51 is configured to, in the fully closed state, separate the bypass passage 4 into an inlet-side passage 41 having a communication port 43 communicating with the scroll passage 36 and an outlet-side passage 42 communicating with the intake passage 32. The inlet-side passage 41 has an inlet-side passage outlet 44 closed by the valve body 51 on the side opposite from the communication port 43. The inlet-side passage outlet 44 opens to a wall surface 401 (valve seat surface) of the bypass passage forming portion 40 on which a flat surface 511 of the valve body 51 abuts in the fully closed state. The wall surface 401 defines a part of the outlet-side passage 42. When the valve body 51 is in the open state, the surface 511 of the valve body 51 is separated from the wall surface 401, and the inlet-side passage 41 and the outlet-side passage 42 communicate with each other through the inlet-side passage outlet 44.

Figure 3:
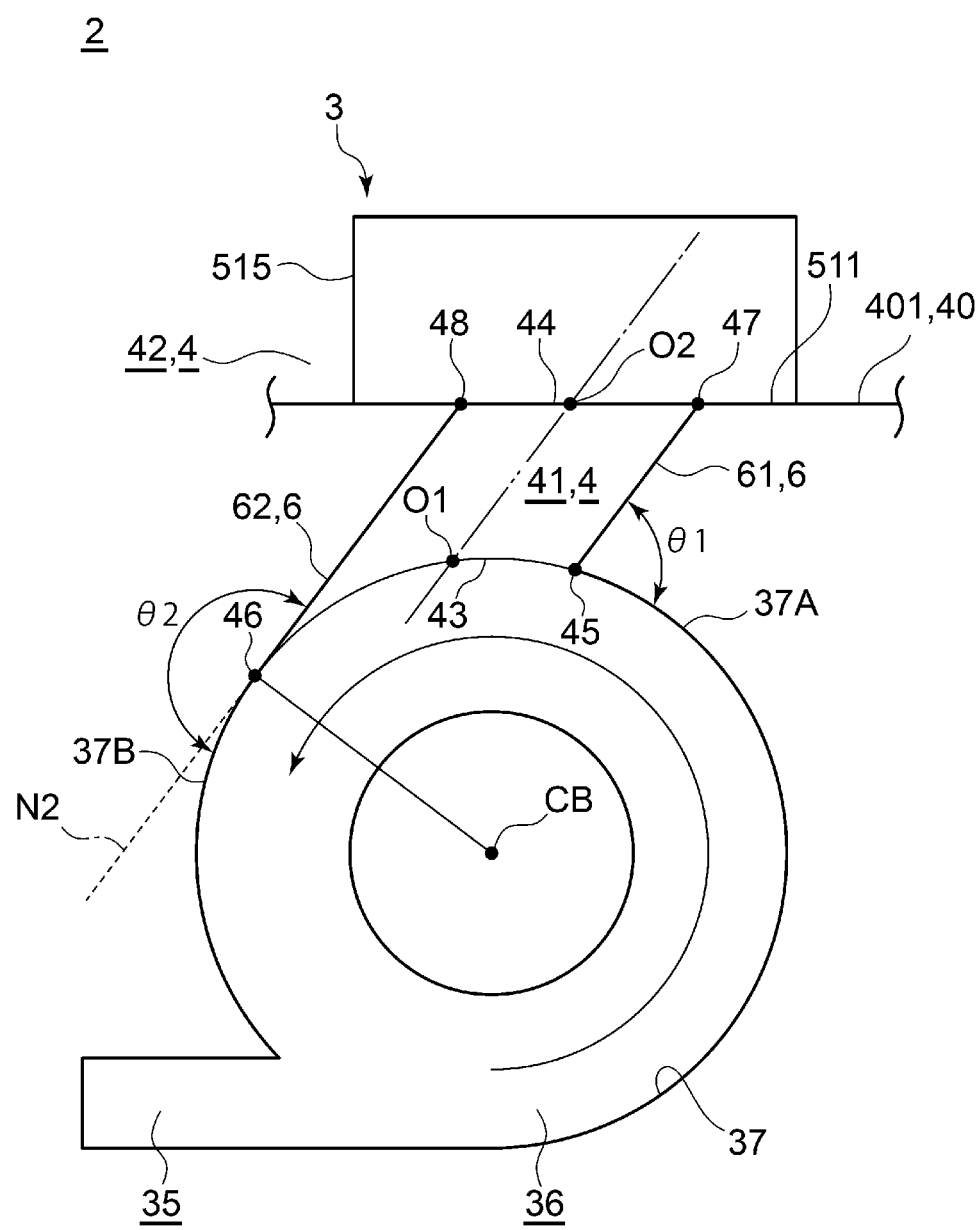
FIG. 3 is a schematic cross-sectional view of the vicinity of an inlet-side passage in a compressor according to an embodiment of the present disclosure.
Figure 4:
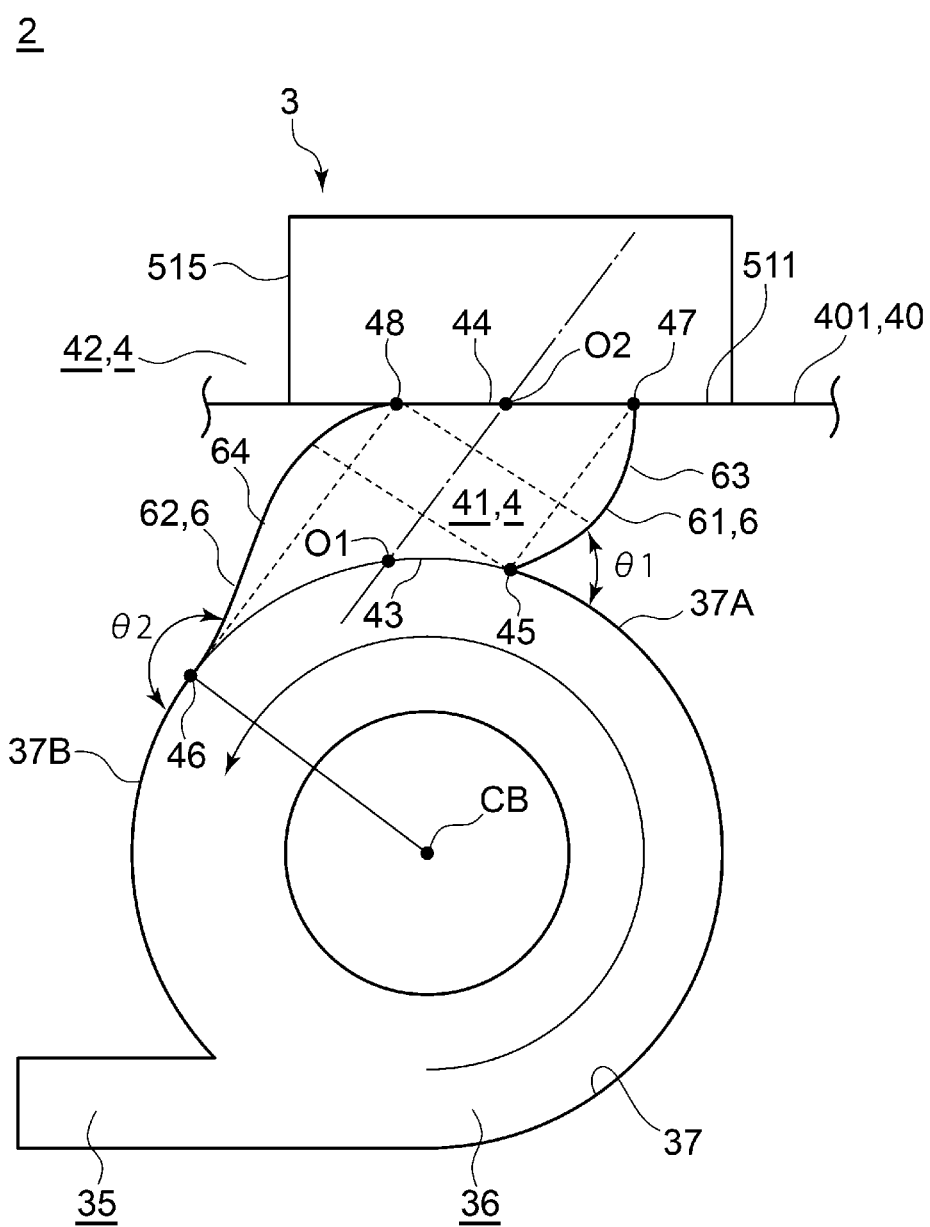
FIG. 4 is a schematic cross-sectional view of the vicinity of an inlet-side passage in a compressor according to an embodiment of the present disclosure.

FIGS. 3 and 4 are each a schematic cross-sectional view of the vicinity of the inlet-side passage in the compressor according to an embodiment of the present disclosure. The arrows in the scroll passage 36 in FIGS. 3, 4 and 5, which will be described later, indicate the flow of gas.

As shown in FIGS. 1 and 2, the compressor 2 according to some embodiments includes the impeller 21, the housing 3, and the bypass valve 5 having the valve body 51. The housing 3 has the intake passage 32, the scroll passage 36, and the bypass passage 4. The valve body 51 is configured to, in the fully closed state, separate the bypass passage 4 into the inlet-side passage 41 and the outlet-side passage 42. Further, as shown in FIGS. 3 and 4, an inlet-side passage wall surface 6 which defines the inlet-side passage 41 includes at least an upstream passage wall surface portion 61 connected to an upstream end 45 of the communication port 43 in a cross-sectional view of the housing 3 taken along the axis CA of the impeller 21. The upstream passage wall surface portion 61 is configured such that an angle θ1 formed with an upstream scroll wall surface 37A of the scroll passage wall surface 37, which defines the scroll passage 36, connected to the upstream end 45 is less than 90 degrees.

Figure 5:
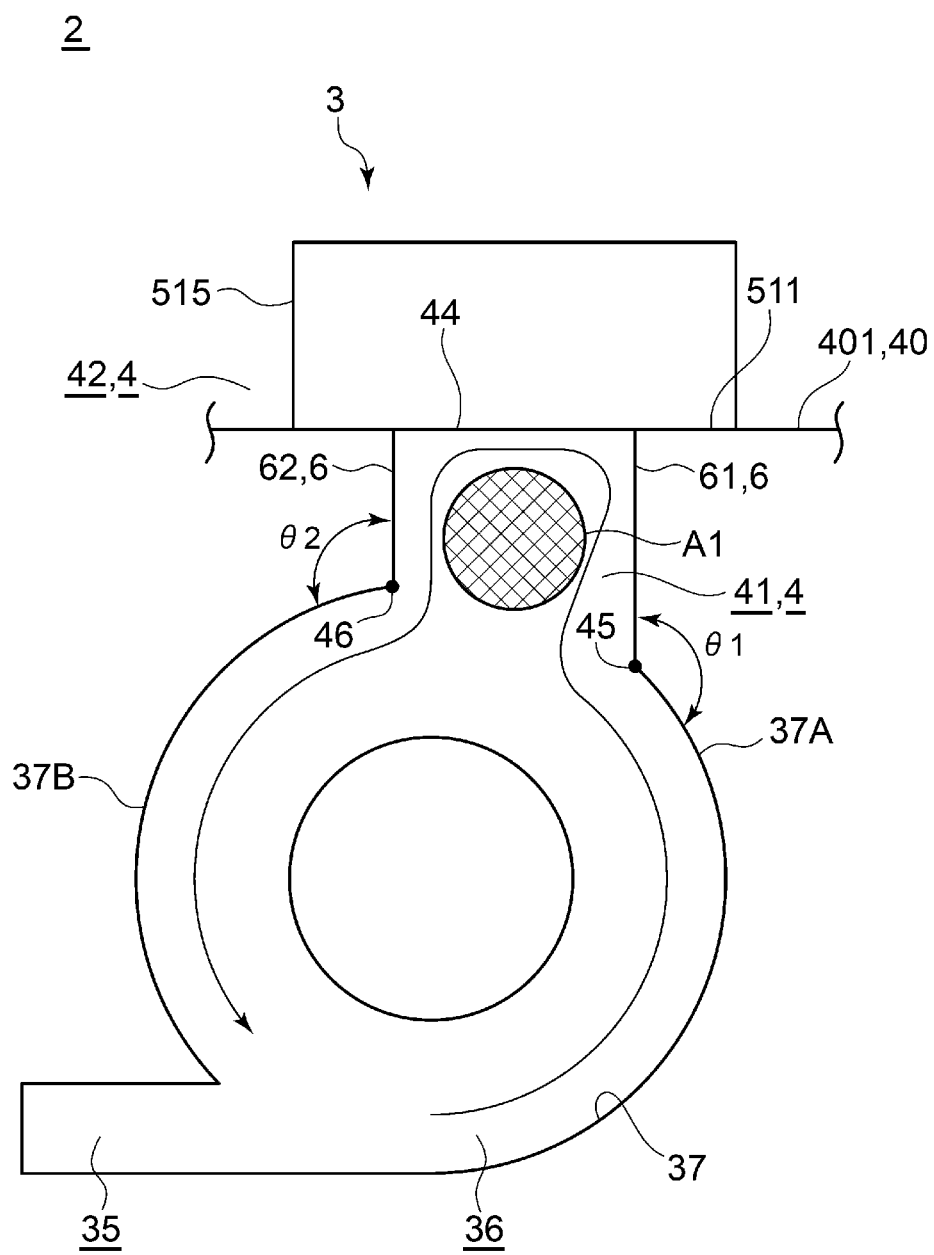
FIG. 5 is a schematic cross-sectional view of the vicinity of an inlet-side passage in a compressor according to a comparative example.

FIG. 5 is a schematic cross-sectional view of the vicinity of the inlet-side passage in the compressor according to a comparative example. As shown in FIG. 5, in the compressor 2A according to the comparative example, the upstream passage wall surface portion 61 is configured such that an angle θ1 formed with the upstream scroll wall surface 37A is more than 90 degrees in a cross-sectional view of the housing 3 taken along the axis CA of the impeller 21. In this case, the gas flowing along the upstream scroll wall surface 37A in the scroll passage 36 enters the inlet-side passage 41 along the upstream passage wall surface portion 61, and the gas entering the inlet-side passage (41) forms a swirl flow as shown in FIG. 5. When the gas forms the swirl flow ill the inlet-side passage 41, a pressure loss region A1 is formed in the central portion of the inlet-side passage 41.

Figure 6:
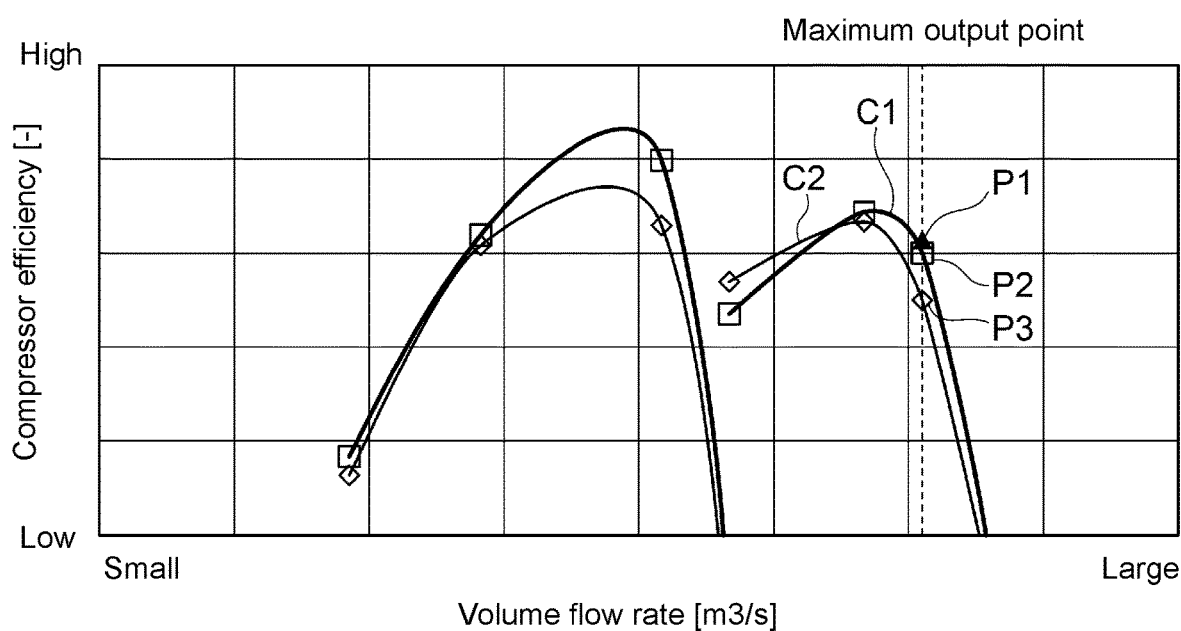
FIG. 6 is an explanatory diagram for describing the effect of a compressor according to an embodiment of the present disclosure and is an explanatory diagram showing the relationship between the intake flow rate (volume flow rate) of the compressor and the efficiency of the compressor.

FIG. 6 is an explanatory diagram for describing the effect of the compressor according to an embodiment of the present disclosure and is an explanatory diagram showing the relationship between the intake flow rate (volume flow rate) of the compressor and the efficiency of the compressor. The curve C1 in FIG. 6 shows the relationship between the intake flow rate (volume flow rate) and the efficiency of the compressor not provided with the bypass passage 4 and the bypass valve 5. The curve C2 in FIG. 6 shows the relationship between the intake flow rate (volume flow rate) and the efficiency of the compressor 2A according to the comparative example. At the maximum output point, the efficiency of the compressor is lower at the point P3 on the curve C2 than at the point P2 on the curve C1. The point P1 in FIG. 6 shows the relationship between the intake flow rate (volume flow rate) and the efficiency at the maximum output point of the compressor 2 according to the present embodiment. As shown in FIG. 6, at the maximum output point, the compressor 2 according to the present embodiment is more efficient than the compressor 2A according to the comparative example, and has an efficiency equivalent to the compressor not provided with the bypass passage 4 and the bypass valve 5.

According to the above configuration, since the upstream passage wall surface portion 61 connected to the upstream end 45 of the communication port 43 is configured such that the angle θ1 formed with the upstream scroll wall surface 37A connected to the upstream end 45 is less than 90 degrees, it is possible to prevent the gas flowing along the upstream scroll wall surface 37A in the scroll passage 36 from entering the inlet-side passage 41, as compared with the case where the angle θ1 formed with the upstream scroll wall surface 37A is equal to or more than 90 degrees. As a result, it is possible to suppress the formation of a swirl flow due to the gas entering the inlet-side passage 41, and it is possible to suppress the increase in pressure loss of the compressor 2 due to the swirl flow formed in the inlet-side passage 41.

Further, the increase in pressure loss of the compressor 2 can be suppressed without shaping the surface 511 of the valve body 51 of the bypass valve 5 in accordance with the scroll passage wall surface 37 as in the configuration described in Patent Document 1. Accordingly, it is possible to suppress the increase in pressure loss of the compressor 2 while suppressing the increase in cost by suppressing the complication of the shape of the valve body 51 of the bypass valve 5.

Further, in the configuration described in Patent Document 1, in order to provide the valve body 51 of the bypass valve 5 along the scroll passage wall surface 37, it is necessary to provide the installation space and movable space of the valve body 51 at a position close to the scroll passage 36 in the bypass passage 4. This restricts the layout of the bypass passage 4, which needs to be connected to the intake passage 32 of the compressor 2. In contrast, according to the above configuration, since the increase in pressure loss can be suppressed without providing the valve body 51 of the bypass valve 5 along the scroll passage wall surface 37, it is not necessary to provide the installation space and movable space of the valve body 51 at a position close to the scroll passage 36 in the bypass passage 4. This makes the layout of the bypass passage 4, which needs to be connected to the intake passage 32 of the compressor 2, more flexible.

In some embodiments, as shown in FIGS. 3 and 4, the inlet-side passage wall surface 6 further includes a downstream passage wall surface portion 62 connected to a downstream end 46 of the communication port 43 in a cross-sectional view of the housing 3 taken along the axis CA of the impeller 21. The downstream passage wall surface portion 62 is configured such that an angle θ2 formed with a downstream scroll wall surface 37B of the scroll passage wall surface 37 connected to the downstream end 46 is less more than 90 degrees and less than 180 degrees.

According to the above configuration, since the downstream passage wall surface portion 62 connected to the downstream end 46 of the communication port 43 is configured such that the angle θ2 formed with the downstream scroll wall surface 37B is more than 90 degrees and less than 180 degrees, it is possible to prevent the gas flowing along the upstream scroll wall surface 37A in the scroll passage 36 from entering the inlet-side passage 41, as compared with the case where the angle θ2 formed with the downstream scroll wall surface 37B is less than 90 degrees. As a result, it is possible to suppress the formation of a swirl flow due to the gas entering the inlet-side passage 41, and it is possible to suppress the increase in pressure loss of the compressor 2 due to the swirl flow formed in the inlet-side passage 41.

In some embodiments, as shown in FIG. 3, at least one of the upstream passage wall surface portion 61 or the downstream passage wall surface portion 62 is configured to extend along the extension direction of a tangent line N2 to the downstream scroll wall surface 37B at the downstream end 46 of the communication port 43 in a cross-sectional view of the housing 3 taken along the axis CA of the impeller 21. In the illustrated embodiment, in the cross-sectional view as shown in FIG. 3, each of the upstream passage wall surface portion 61 and the downstream passage wall surface portion 62 extends along the extension direction of the tangent line N2. Here, the tangent line N2 is orthogonal at the downstream end 46 to the line connecting, the center CB of the scroll passage 36 and the downstream end 46 in the cross-sectional view.

In the illustrated embodiment, in the cross-sectional view as shown in FIG. 3, the upstream passage wall surface portion 61 extends linearly from the upstream end 45 of the communication port 43 to the upstream end 47 of the inlet-side passage outlet 44, and the downstream passage wall surface portion 62 extends linearly from the downstream end 46 of the communication port 43 to the downstream end 48 of the inlet-side passage outlet 44. Accordingly, in the cross-sectional view, the straight line N1 passing through the center O1 of the communication port 43 and the center O2 of the inlet-side passage outlet 44 also extends along the extension direction of the tangent line N2. Here, the center O1 of the communication port. 43 means the centroid, i.e., the center of gravity of the communication port 43. The center O2 of the inlet-side passage outlet 44 means the centroid, i.e., the center of gravity of the inlet-side passage outlet 44.

According to the above configuration, since the upstream passage wall surface portion 61 or the downstream passage wall surface portion 62 is configured to extend along the extension direction of the tangent line N2 to the downstream scroll wall surface 37B at the downstream end 46 of the communication port 43, the inlet-side passage 41 defined by the upstream passage wall surface portion 61 and the downstream passage wall surface portion 62 can be extended in a direction opposite to the flow direction of the gas flowing through the scroll passage 36 from the communication port 43. Thus, it is possible to effectively prevent the gas flowing through the scroll passage 36 along the upstream scroll wall surface 37A from entering the inlet-side passage 41.

When the area of the plane orthogonal to the straight line N1 in the inlet-side passage 41 is defined as the flow passage area, in the embodiment shown in FIG. 3, the flow passage area is narrowed in the plane passing through the upstream end 45 of the communication port 43 and the plane passing through the downstream end 48 of the inlet-side passage outlet 44.

In some embodiments, as shown in FIG. 4, at least one wall surface portion (wall surface portion 61 or 62) of the upstream passage wall surface portion 61 or the downstream passage wall surface portion 62 includes a curved portion (63, 64) which is concavely curved in a direction away from the other wall surface portion (wall surface portion 61 or 62) in a cross-sectional view of the housing 3 taken along the axis CA of the impeller 21. In the embodiment shown in FIG. 4, in the cross-sectional view, the upstream passage wall surface portion 61 includes a curved portion 63, and the downstream passage wall surface portion 62 includes a curved portion 64. Thus, as compared to the embodiment shown in FIG. 3, the flow passage area is enlarged in the plane passing through the upstream end 45 of the communication port 43 and the plane passing through the downstream end 48 of the inlet-side passage outlet 44.

According to the above configuration, since the upstream passage wall surface portion 61 or the downstream passage wall surface portion 62 includes the curved portion (curved portion 63, 64) which is concavely curved in a direction away from the other wall surface portion (wall surface portion 61 or 62), the cross-sectional area (flow passage area) in the middle of the inlet-side passage 41 (the side closer to the inlet-side passage outlet 44 closed by the valve body 51 than the communication port 43) can be increased while suppressing the increase in opening area of the communication port 43. By increasing the cross-sectional area (flow passage area) in the middle of the inlet-side passage 41, it is possible to increase the flow rate of the bypass passage 4 when the valve body 51 is open. Thus, it is possible to ensure the required flow rate of the bypass passage 4.

In some embodiments, as shown in FIG. 4, the inlet-side passage 41 is configured to have a flow passage area that is equal to or larger than the opening area of the inlet-side passage outlet 44 closed by the valve body 51 from the inlet-side passage outlet 44 to the communication port 43.

According to the above configuration, since the inlet-side passage 41 is configured to have a flow passage area that is equal to or larger than the opening area of the inlet-side passage outlet 44 closed by the valve body 51 from the inlet-side passage outlet 44 to the communication port 43, when the valve body 51 is in the open state, the gas can flow into the intake passage 32 without obstructing the flow of the gas entering the inlet-side passage 41 of the bypass passage 4 from the scroll passage 36 and flowing out to the outlet-side passage 42. Thus, it is possible to increase the flow rate of the bypass passage 4 when the valve body 51 is open.

Figure 7:
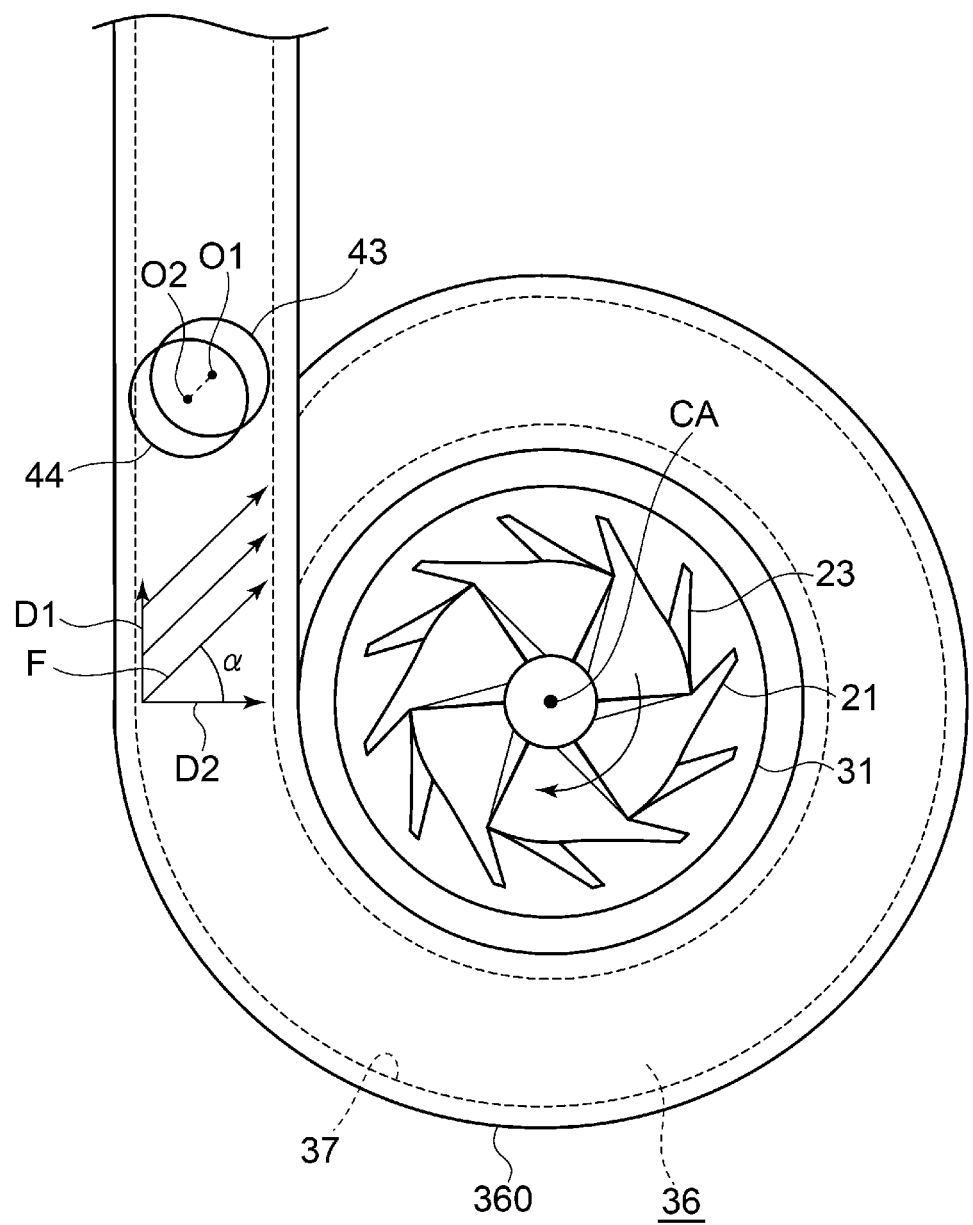
FIG. 7 is a schematic diagram schematically showing a compressor according to an embodiment of the present disclosure when viewed from the front in the axial direction.

FIG. 7 is a schematic diagram schematically showing the compressor according to an embodiment of the present disclosure when viewed from the front in the axial direction.

As shown in FIGS. 1 and 2, the compressor 2 according to some embodiments includes the impeller 21, the housing 3, and the bypass valve 5 having the valve body 51. The housing 3 has the intake passage 32, the scroll passage 36, and the bypass passage 4. The valve body 51 is configured to, in the fully closed state, separate the bypass passage 4 into the inlet-side passage 41 and the outlet-side passage 42. Further, as shown in FIG. 7, the inlet-side passage 41 is configured such that the center O1 of the communication port 43 is positioned more downstream than the center O2 of the inlet-side passage outlet 44 closed by the valve body 51 in a swirling direction F of the gas flowing through the scroll passage 36.

As shown in FIG. 7, the gas flowing through the scroll passage 36 flows from upstream to downstream while swirling along the swirling direction F. The swirling direction F includes a component D1 that moves from upstream to downstream in the scroll passage 36 and a component D2 that rotates in a direction perpendicular to the component D1, and is inclined downstream (at angle α) with respect to the component D2. The gas flowing through the scroll passage 36 flows from the outer side in the radial direction in the scroll passage to the inner side in the radial direction along the wall surface located on the front side in the figure.

According to the above configuration, the inlet-side passage 41 is configured such that the center O1 of the communication port 43 is positioned more downstream than the center O2 of the inlet-side passage outlet 44 in the swirling direction F of the gas flowing through the scroll passage 36. In this case, since the inlet-side passage 41 extends in the direction opposite to the swirling direction F of the gas flowing through the scroll passage 36, it is possible to prevent the gas flowing through the scroll passage 36 along the swirling direction F from entering the inlet-side passage 41. As a result, it is possible to suppress the formation of a swirl flow due to the gas entering the inlet-side passage 41, and it is possible to suppress the increase in pressure loss of the compressor 2 due to the swirl flow formed in the inlet-side passage 41.

Further, the increase in pressure loss of the compressor 2 can be suppressed without shaping the surface 511 of the valve body 51 of the bypass valve 5 in accordance with the scroll passage wall surface 37 as in the configuration described in Patent Document 1. Accordingly, it is possible to suppress the increase in pressure loss of the compressor 2 while suppressing the increase in cost by suppressing the complication of the shape of the valve body 51 of the bypass valve 5.

Further, in the configuration described in Patent Document 1, in order to provide the valve body 51 of the bypass valve 5 along the scroll passage wall surface 37, it is necessary to provide the installation space and movable space of the valve body 51 at a position close to the scroll passage 36 in the bypass passage 4. This restricts the layout of the bypass passage 4, which needs to be connected to the intake passage 32 of the compressor 2. In contrast, according to the above configuration, since the increase in pressure loss can be suppressed without providing the valve body 51 of the bypass valve 5 along the scroll passage wall surface 37, it is not necessary to provide the installation space and movable space of the valve body 51 at a position close to the scroll passage 36 in the bypass passage 4. This makes the layout of the bypass passage 4, which needs to be connected to the intake passage 32 of the compressor 2, more flexible.

The present embodiment can be implemented independently, but it may be combined with the above-described embodiments. By combining the present embodiment with the above-described embodiments, it is possible to more effectively prevent the gas flowing through the scroll passage 36 from entering the inlet-side passage 41.

In some embodiment, as shown in FIG. 1, the compressor 2 according to some embodiments includes the compressor 2 having the impeller 21 and the housing 3, and a turbine 12 having a turbine rotor 13 connected to the impeller 21 of the compressor 2 via a rotational shaft 11. In this case, since the increase in pressure loss of the compressor 2 due to the swirl flow formed in the inlet-side passage 41 can be suppressed it is possible to improve the efficiency of the compressor 2.

The present disclosure is not limited to the embodiments described above, but includes modifications to the embodiments described above, and embodiments composed of combinations of those embodiments.

The contents described in the above embodiments would be understood as follows, for instance.

1) A compressor (2) according to the present disclosure comprises: an impeller (21); a housing (3) configured to rotatably house the impeller (21) and having an intake passage (32) for introducing a gas to the impeller (21) from outside the housing (3), a scroll passage (36) for guiding the gas having passed through the impeller (21) to the outside, and a bypass passage (4) connecting the intake passage (32) and the scroll passage (36) so as to bypass the impeller (21); and a bypass valve (5) having a valve body (51) disposed in the bypass passage (4) and capable of opening and closing the bypass passage (4). The valve body (51) is configured to, in a fully closed state, separate the bypass passage (4) into an inlet-side passage (41) having a communication port (43) communicating with the scroll passage (36) and an outlet-side passage (42) communicating with the intake passage (32). An inlet-side passage wall surface (6) which defines the inlet-side passage (41) includes at least an upstream passage wall surface portion (61) connected to an upstream end (45) of the communication port (43) in a cross-sectional view of the housing (3) taken along an axis (CA) of the impeller (21). The upstream passage wall surface portion (61) is configured such that an angle (θ1) between the upstream passage wall surface portion (61) and an upstream scroll wall surface (37A) of a scroll passage wall surface (37) which defines the scroll passage (36) connected to the upstream end (45) is less than 90 degrees.

According to the configuration 1), since the upstream passage wall surface portion (61) connected to the upstream end (45) of the communication port (43) is configured such that the angle (θ1) formed with the upstream scroll wall surface (37A) connected to the upstream end (45) is less than 90 degrees, it is possible to prevent the gas flowing along the upstream scroll wall surface (37A) in the scroll passage (36) from entering the inlet-side passage (41), as compared with the case where the angle (θ1) formed with the upstream scroll wall surface (37A) is equal to or more than 90 degrees. As a result, it is possible to suppress the formation of a swirl flow due to the gas entering the inlet-side passage (41), and it is possible to suppress the increase in pressure loss of the compressor (2) due to the swirl flow formed in the inlet-side passage (41).

Further, the increase in pressure loss of the compressor (2) can be suppressed without shaping the surface (511) of the valve body (51) of the bypass valve (5) in accordance with the scroll passage wall surface (37) as in the configuration described in Patent Document 1. Accordingly, it is possible to suppress the increase in pressure loss of the compressor (2) while suppressing the increase in cost by suppressing the complication of the shape of the valve body (51) of the bypass valve (5).

Further, in the configuration described in Patent Document 1, in order to provide the valve body (51) of the bypass valve (5) along the scroll passage wall surface (37), it is necessary to provide the installation space and movable space of the valve body (51) at a position close to the scroll passage (36) in the bypass passage (4). This restricts the layout of the bypass passage (4), which needs to be connected to the intake passage (32) of the compressor (2). In contrast, according to the configuration 1), since the increase in pressure loss can be suppressed without providing the valve body (51) of the bypass valve (5) along the scroll passage wall surface (37), it is not necessary to provide the installation space and movable space of the valve body (51) at a position close to the scroll passage (36) in the bypass passage (4). This makes the layout of the bypass passage (4), which needs to be connected to the intake passage (32) of the compressor (2), more flexible.

2) In some embodiments, in the compressor (2) described in the above 1), the inlet-side passage wall surface (41) further includes a downstream passage wall surface portion (62) connected to a downstream end (46) of the communication port (43) in a cross-sectional view of the housing (3) taken along the axis (CA) of the impeller (21). The downstream passage wall surface portion (62) is configured such that an angle (θ2) between the downstream passage wall surface portion (62) and a downstream scroll wall surface (37B) of the scroll passage wall surface (37) connected to the downstream end (46) is more than 90 degrees and less than 180 degrees.

According to the configuration 2), since the downstream passage wall surface portion (62) connected to the downstream end (46) of the communication port (43) is configured such that the angle (θ2) formed with the downstream scroll wall surface (37B) is more than 90 degrees and less than 180 degrees, it is possible to prevent the gas flowing along the upstream scroll wall surface (37A) in the scroll passage (36) from entering the inlet-side passage (41), as compared with the case where the angle (θ2) formed with the downstream scroll wall surface (37B) is less than 90 degrees. As a result, it is possible to suppress the formation of a swirl flow due to the gas entering the inlet-side passage (41), and it is possible to suppress the increase in pressure loss of the compressor (2) due to the swirl flow formed in the inlet-side passage (41).

3) In some embodiments, in the compressor (2) described in the above 2), at least one of the upstream passage wall surface portion (61) or the downstream passage wall surface portion (62) is configured to extend along an extension direction of a tangent line (N2) to the downstream scroll wall surface (37B) at the downstream end (46) of the communication port (43) in a cross-sectional view of the housing (3) taken along the axis (CA) of the impeller (21).

According to the above configuration, since the upstream passage wall surface portion (61) or the downstream passage wall surface portion (62) is configured to extend along the extension direction of the tangent line (N2) to the downstream scroll wall surface (37B) at the downstream end (46) of the communication port (43), the inlet-side passage (41) defined by the upstream passage wall surface portion (61) and the downstream passage wall surface portion (62) can be extended in a direction opposite to the flow direction of the gas flowing through the scroll passage (36) from the communication port (43). Thus, it is possible to effectively prevent the gas flowing through the scroll passage (36) along the upstream scroll wall surface (37A) from entering the inlet-side passage (41).

4) In some embodiments, in the compressor (2) described in the above 2), at least one wall surface portion (61 or 62) of the upstream passage wall surface portion (61) or the downstream passage wall surface portion (62) includes a curved portion (63, 64) which is concavely curved in a direction away from the other wall surface portion (61 or 62) in a cross-sectional view of the housing (3) taken along the axis (CA) of the impeller (21).

According to the above configuration, since the upstream passage wall surface portion (61) or the downstream passage wall surface portion (62) includes the curved portion (63, 64) which is concavely curved in a direction away from the other wall surface portion (61 or 62), the cross-sectional area in the middle of the inlet-side passage (41) (the side closer to the inlet-side passage outlet 44 closed by the valve body 51 than the communication port 43) can be increased while suppressing the increase in opening area of the communication port (43). By increasing the cross-sectional area in the middle of the inlet-side passage (41), it is possible to increase the flow rate of the bypass passage (4) when the valve body (51) is open. Thus, it is possible to ensure the required flow rate of the bypass passage (4).

5) In some embodiments, in the compressor (2) described in the above 4), the inlet-side passage (41) is configured to have a flow passage area that is equal to or larger than an opening area of an inlet-side passage outlet (44) closed by the valve body (51) from the inlet-side passage outlet (44) to the communication port (43).

According to the configuration 5), since the inlet-side passage (41) is configured to have a flow passage area that is equal to or larger than the opening area of the inlet-side passage outlet (44) closed by the valve body (51) from the inlet-side passage outlet (44) to the communication port (43), when the valve body (51) is in the open state, the gas can flow into the intake passage (32) without obstructing the flow of the gas entering the inlet-side passage (41) of the bypass passage (4) from the scroll passage (36) and flowing out to the outlet-side passage (42). Thus, it is possible to increase the flow rate of the bypass passage (4) when the valve body (51) is open.

6) In some embodiments, in the compressor (2) described in any one of the above 1) to 5), the inlet-side passage (41) is configured such that center (O1) of the communication port (43) is positioned more downstream than center (O2) of an inlet-side passage outlet (44) closed by the valve body (51) in a swirling direction (F) of the gas flowing through the scroll passage (36).

According to the configuration 6), the inlet-side passage (41) is configured such that the center (O1) of the communication port (43) is positioned more downstream than the center (O2) of the inlet-side passage outlet (44) in the swirling direction (F) of the gas flowing through the scroll passage (36). In this case, since the inlet-side passage (41) extends in the direction opposite to the swirling direction (F) of the gas flowing through the scroll passage (36), it is possible to prevent the gas flowing through the scroll passage (36) along the swirling direction (F) from entering the inlet-side passage (41). As a result, it is possible to suppress the formation of a swirl flow due to the gas entering the inlet-side passage (41), and it is possible to suppress the increase in pressure loss of the compressor (2) due to the swirl flow formed in the inlet-side passage (41).

7) A compressor (2) according to the present disclosure comprises: an impeller (21); a housing (3) configured to rotatably house the impeller (21) and having an intake passage (32) for introducing a gas to the impeller (21) from outside the housing (3), a scroll passage (36) for guiding the gas having passed through the impeller (21) to the outside, and a bypass passage (4) connecting the intake passage (32) and the scroll passage (36) so as to bypass the impeller (21); and a bypass valve (5) having a valve body (51) disposed in the bypass passage (4) and capable of opening and closing the bypass passage (4). The valve body (51) is configured to, in a fully closed state, separate the bypass passage (4) into an inlet-side passage (41) having a communication port (43) communicating with the scroll passage (36) and an outlet-side passage (42) communicating with the intake passage (32). The inlet-side passage (41) is configured such that center (O1) of the communication port (43) is positioned more downstream than center (O2) of an inlet-side passage outlet (44) closed by the valve body (51) in a swirling direction (F of the gas flowing through the scroll passage (36).

According to the configuration 7), the inlet-side passage (41) is configured such that the center (O1) of the communication port (43) is positioned more downstream than the center (O2) of the inlet-side passage outlet (44) in the swirling direction (F) of the gas flowing through the scroll passage (36). In this case, since the inlet-side passage (41) extends in the direction opposite to the swirling direction (F) of the gas flowing through the scroll passage (36), it is possible to prevent the gas flowing through the scroll passage (36) along the swirling direction (F) from entering the inlet-side passage (41). As a result, it is possible to suppress the formation of a swirl flow due to the gas entering the inlet-side passage (41), and it is possible to suppress the increase in pressure loss of the compressor (2) due to the swirl flow formed in the inlet-side passage (41).

Further, the increase in pressure loss of the compressor (2) can be suppressed without shaping the surface (511) of the valve body (51) of the bypass valve (5) in accordance with the scroll passage wall surface (37) as in the configuration described in Patent Document 1. Accordingly, it is possible to suppress the increase in pressure loss of the compressor (2) while suppressing the increase in cost by suppressing the complication of the shape of the valve body (51) of the bypass valve (5).

Further, in the configuration described in Patent Document 1, in order to provide the valve body (51) of the bypass valve (5) along the scroll passage wall surface (37), it is necessary to provide the installation space and movable space of the valve body (51) at a position close to the scroll passage (36) in the bypass passage (4). This restricts the layout of the bypass passage (4), which needs to be connected to the intake passage (32) of the compressor (2). In contrast, according to the configuration 7), since the increase in pressure loss can be suppressed without providing the valve body (51) of the bypass valve (5) along the scroll passage wall surface (37), it is not necessary to provide the installation space and movable space of the valve body (51) at a position close to the scroll passage (36) in the bypass passage (4). This makes the layout of the bypass passage (4), which needs to be connected to the intake passage, (32) of the compressor (2), more flexible.

8) A turbocharger (1) according to at least one embodiment of the present disclosure comprises: the compressor (2) described in any one of the above 1) to 7); and a turbine (12) having a turbine rotor (13) connected to the impeller (21) of the compressor (2) via a rotational shall (11).

According to the configuration 8), since the increase in pressure loss of the compressor (2) due to the swirl flow formed in the inlet-side passage (41) can be suppressed, it is possible to improve the efficiency of the compressor (2).

REFERENCE SIGNS LIST

1 Turbocharger
11 Rotational shaft
12 Turbine
13 Turbine rotor
14 Turbine housing
15 Bearing
16 Bearing housing
2 Compressor
2A Compressor according to comparative example
21 Impeller
22 Hub
23 impeller blade
3 Housing
31 Intake port
32 Intake passage
33 impeller chamber
34 Shroud surface
35 Diffuser passage
36 Scroll passage
37 Scroll passage wall surface
37A Upstream scroll wall surface
37B Downstream scroll wall surface
4 Bypass passage
40 Passage forming portion
41 Inlet-side passage
42 Outlet-side passage
43 Communication port
44 Inlet-side passage outlet
45, 47 Upstream end
46, 48 Downstream end
5 Bypass valve 51 Valve body
52 Actuator
6 Inlet-side passage wall surface
61 Upstream passage wall surface portion
62 Downstream passage wall surface portion
63, 64 Curved portion
A1 Pressure loss region
CA Axis
D1, D2 Component
F Swirling direction
N1 Straight line
N2 Tangent line
O1, O2 Center
X Axial direction
XF Front side
XR Rear sole
Y Radial direction

The invention claimed is:

1. A compressor, comprising:
an impeller;
a housing configured to rotatably house the impeller,
the housing having
an intake passage for introducing a gas to the impeller from outside the housing,
a scroll passage for guiding the gas having passed through the impeller to the outside, and
a bypass passage connecting the intake passage and the scroll passage so as to bypass the impeller; and
a bypass valve having a valve body disposed in the bypass passage and capable of opening and closing the bypass passage,
wherein the valve body is configured to, in a fully closed state, separate the bypass passage into an inlet-side passage having a communication port communicating with the scroll passage and an outlet-side passage communicating with the intake passage,
wherein an inlet-side passage wall surface which defines the inlet-side passage includes at least an upstream passage wall surface portion connected to an upstream end of the communication port in a cross-sectional view of the housing taken along an axis of the impeller,
wherein the upstream passage wall surface portion is configured such that an angle between the upstream passage wall surface portion and an upstream scroll wall surface of a scroll passage wall surface which defines the scroll passage connected to the upstream end is less than 90 degrees,
wherein the inlet-side passage wall surface further includes a downstream passage wall surface portion connected to a downstream end of the communication port in a cross-sectional view of the housing taken along the axis of the impeller, and
wherein the downstream passage wall surface portion is configured such that an angle between the downstream passage wall surface portion and a downstream scroll wall surface of the scroll passage wall surface connected to the downstream end is more than 90 degrees and less than 180 degrees, and
wherein at least one of the upstream passage wall surface portion or the downstream passage wall surface portion is configured to extend along an extension direction of a tangent line to the downstream scroll wall surface at the downstream end of the communication port in a cross-sectional view of the housing taken along the axis of the impeller.

2. The compressor according to claim 1,
wherein the inlet-side passage is configured such that center of the communication port is positioned more downstream than center of an inlet-side passage outlet closed by the valve body in a swirling direction of the gas flowing through the scroll passage.

3. A compressor, comprising:
an impeller;
a housing configured to rotatably house the impeller,
the housing having
an intake passage for introducing a gas to the impeller from outside the housing,
a scroll passage for guiding the gas having passed through the impeller to the outside, and
a bypass passage connecting the intake passage and the scroll passage so as to bypass the impeller; and
a bypass valve having a valve body disposed in the bypass passage and capable of opening and closing the bypass passage,
wherein the valve body is configured to, in a fully closed state, separate the bypass passage into an inlet-side passage having a communication port communicating with the scroll passage and an outlet-side passage communicating with the intake passage,
wherein an inlet-side passage wall surface which defines the inlet-side passage includes at least an upstream passage wall surface portion connected to an upstream end of the communication port in a cross-sectional view of the housing taken along an axis of the impeller,
wherein the upstream passage wall surface portion is configured such that an angle between the upstream passage wall surface portion and an upstream scroll wall surface of a scroll passage wall surface which defines the scroll passage connected to the upstream end is less than 90 degrees,
wherein the inlet-side passage wall surface further includes a downstream passage wall surface portion connected to a downstream end of the communication port in a cross-sectional view of the housing taken along the axis of the impeller,
wherein the downstream passage wall surface portion is configured such that an angle between the downstream passage wall surface portion and a downstream scroll wall surface of the scroll passage wall surface connected to the downstream end is more than 90 degrees and less than 180 degrees, and
wherein at least one wall surface portion of the upstream passage wall surface portion or the downstream passage wall surface portion includes a curved portion which is concavely curved in a direction away from the other wall surface portion in a cross-sectional view of the housing taken along the axis of the impeller.

4. The compressor according to claim 3,
wherein the inlet-side passage is configured to have a flow passage area that is equal to or larger than an opening area of an inlet-side passage outlet closed by the valve body from the inlet-side passage outlet to the communication port.

5. A compressor, comprising:
an impeller;
a housing configured to rotatably house the impeller,
the housing having
an intake passage for introducing a gas to the impeller from outside the housing,
a scroll passage for guiding the gas having passed through the impeller to the outside, and a bypass passage connecting the intake passage and the scroll passage so as to bypass the impeller; and a bypass valve having a valve body disposed in the bypass passage and capable of opening and closing the bypass passage, wherein the valve body is configured to, in a fully closed state, separate the bypass passage into an inlet-side passage having a communication port communicating with the scroll passage and an outlet-side passage communicating with the intake passage, and wherein the inlet-side passage is configured such that center of the communication port is positioned more downstream than center of an inlet-side passage outlet closed by the valve body in a swirling direction of the gas flowing through the scroll passage, the swirling direction of the gas flowing including a first component that moves from upstream to downstream in the scroll passage and a second component that rotates in a direction perpendicular to the first component.

6. A turbocharger, comprising:
the compressor according to claim 1; and
a turbine having a turbine rotor connected to the impeller of the compressor via a rotational shaft.

7. A turbocharger, comprising:
the compressor according to claim 5; and
a turbine having a turbine rotor connected to the impeller of the compressor via a rotational shaft.

\* \* \* \* \*